United States Patent
Loeb

[15] 3,675,485
[45] July 11, 1972

[54] METHOD AND APPARATUS FOR MEASURING VARIATIONS IN A QUANTITY WITH RESPECT TO A KNOWN REFERENCE VALUE

[72] Inventor: Julien M. Loeb, Cloud, France
[73] Assignee: Compagnie Generale De Ceophysique, Paris, France
[22] Filed: June 18, 1969
[21] Appl. No.: 834,397

[30] Foreign Application Priority Data
June 19, 1968 France ..................................... 15535

[52] U.S. Cl. .............................................73/382, 324/77 R
[51] Int. Cl. .........................................................G01v 7/00
[58] Field of Search ...................73/382; 325/65; 324/77 R

[56] References Cited

UNITED STATES PATENTS

| | | |
|---|---|---|
| 2,657,581 | 11/1953 | Fay et al. .................................73/382 |
| 2,917,300 | 12/1959 | Spiess .....................................73/382 |
| 3,019,655 | 2/1962 | Graf.........................................73/382 |
| 3,147,624 | 9/1964 | Trimble...................................73/462 |
| 2,534,005 | 12/1950 | DeBoisblanc............................73/35 |

Primary Examiner—Richard C. Queisser
Assistant Examiner—Herbert Goldstein
Attorney—Waters, Roditi & Schwartz

[57] ABSTRACT

A method is provided for measuring the deviations of a quantity from the standard value for the same quantity, in the presence of stray interferences of greater amplitude and higher frequency than the variations to be measured. The procedure for effecting the method consists essentially in measuring the instantaneous values of the aforesaid quantity; eliminating all instantaneous values falling outside of a limited region of amplitude variations of the aforesaid quantity, inside of which the standard value of the quantity is located; determining the average, in time, of the instantaneous values situated within said region; and determining the difference between the average and the standard value of the aforesaid quantity, which difference constitutes the deviation sought. Apparatus is also provided for the application of the method to vibrating-wire gravimetry.

7 Claims, 2 Drawing Figures

METHOD AND APPARATUS FOR MEASURING VARIATIONS IN A QUANTITY WITH RESPECT TO A KNOWN REFERENCE VALUE

FIELD TO WHICH THE INVENTION RELATES

The invention relates to a method and to an apparatus for measuring the deviations of a quantity from a known standard value, in the presence of random interferences of greater amplitude and higher frequency than the deviations.

The invention is applicable more specifically to the measurement of variations of gravity, i.e. to gravimetry, in the case, where the measuring means are placed on a mobile vehicle and are subjected to the vertical accelerations of same.

An object of the invention is to provide a method and an apparatus for converting the signals of measurement of the vertical accelerations in such a manner as to limit the effect of these signals without losing the information, which they carry, so that the average value of these signals can be determined with satisfactory accuracy.

STATE OF THE ART

There are known gravimeters in which the value of gravity is obtained from the measurement of a current whose electrodynamic force balances the weight of a solid body. Also known are gravimeters, in which the value of gravity is obtained from the frequency of vibration of an oscillating wire subjected to the traction of a weight.

When the gravimeter is installed on board a moving vehicle, for example a ship, or an aircraft, the accelerations due to the movement of the vehicle are of an order of magnitude far greater than the value of the variation of gravity which is to be measured. It follows from this circumstance, that it is necessary to utilize measuring instruments of very considerable dynamic range, since such dynamic range is imposed by the absolute value of the interference accelerations impressed upon the measuring instrument by the movements of the vehicle upon which it is installed; this, in turn, makes necessary the utilization of amplifiers of very considerable dynamic range, which must possess excellent linearity, for amplifying the signals emanating from the sensors sensitive to the action of gravity and generating output signals of sufficient strength for their ultimate interpretation. Such measuring instrumentation is delicate to build and to use, and it is costly.

SUMMARY OF THE INVENTION

The method according to the invention essentially comprises measuring the instantaneous values of a quantity; eliminating all instantaneous values situated outside of a predetermined region of amplitude variations of said quantity, the standard value of which is situated within said region; determining the average, in time, of the instantaneous values situated inside said region; and determining the difference between said average and the standard value of the aforesaid quantity, which difference constitutes the variation sought.

According to a particular mode of realization of an embodiment of means for applying the method, there is provided a vibrating-wire gravimeter which can perform measurements while being installed on board a moving vehicle, for example, an aircraft or a ship, and which, on account of these movements is subjected to random vertical accelerations, the value of which is very much greater than the variation of gravity between the value determined at a known location and the value of the measurement which is sought.

A measuring instrument according to the invention comprises: a sensitive element having a natural resonance frequency, the value of which is characteristic of the quantity to be measured; an oscillator assembly, which includes said sensitive element, and further comprises amplifying and feedback means such that the natural oscillating frequency of the oscillator assembly will be equal to the resonance frequency of the sensitive element, and a subtracting device; a local oscillator of fixed and stable oscillating frequency; and an integrating phasemeter; the subtracting device combining the amplitudes of oscillation of the oscillator assembly and the local oscillator in such a manner that the oscillator assembly is compelled to undergo forced oscillation at the frequency of the local oscillator; the integrating phasemeter furnishing indication of the average phase shift between the oscillation amplitudes of the oscillator assembly and the local oscillator, this average phase shift being characteristic for the value of the quantity to be measured.

DESCRIPTION OF THE PREFERRED EMBODIMENTS

Figure 1:
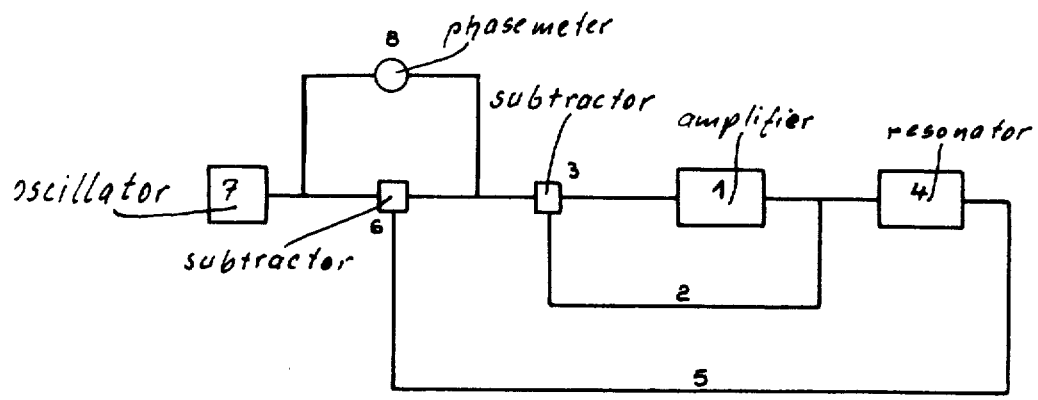
FIG. 1 diagrammatically represents an apparatus for the application of the method of the invention in a gravimetric field.

The research work undertaken by the inventor has made it possible to find out by calculation and to prove experimentally, that it is possible to calculate correctly an average value by retaining from the totality of the instantaneous values of the signals furnished by a measuring instrument in the course of the measuring operation, only those values situated inside a limited region of the range of the amplitudes of the signal, on the condition that this limited region is appreciably centered around the sought value, which value is sufficiently precisely known in advance for permitting such centering.

This operation makes it possible to reduce in considerable proportion the autocorrelation function of noise.

In other terms, for the calculation of said value there are deliberately only considered those instantaneous values of the measured signal which are situated inside the region $(M - a)$ and $(M + a)$, $M$ being an approximate value of the quantity to be measured (for example, a fixed reference value), and $a$ a predetermined value, very much less than the interference disturbances to be eliminated, yet sufficiently significant for assuring that the region $(M - a)$ to $(M + a)$ encompasses the value to be measured. The values situated outside of this region are treated for calculating the average only as if they had coincided with $(M + a)$, or $(M - a)$, respectively.

In order to simplify the language, the operation of substituting according to the case, $(M + a)$, or $(M - a)$, respectively, for the values furnished by the measuring instrument falling outside of the aforesaid region, shall hereafter be designated as clipping, and the values furnished by this operation, as transformed values.

The average of the transformed values so obtained, is a correct average under the sole condition that the interference disturbances over the duration of the measuring operation have an average value of zero. This duration is chosen to be large in comparison with the cycle of the slowest of the interference oscillations.

It should be noted that the invention, which will be described hereinafter with reference to its application to gravimeters, is by no means limited to this particular application, since it finds its utilization in all cases where the problem is to measure the average value of a signal augmented by interference signals of an amplitude very much greater than that of the signal proper, and having a zero average value.

It is known that a gravimeter serves for measuring the value $g$ of gravity at a given location. The measured value is related to the reference value $g_o$ of gravity by the formula I:

$$g = g_o (1 + \gamma + \Gamma) \tag{1}$$

in which $\gamma$ is the desired quantity to be evaluated and $\Gamma$ is the interference acceleration due to vehicle movement. $g$ is found by calculating the average, in time, of the righthand term in formula I. The putting into practice of the method according to the invention thus consists in retaining out of all the $g$ values furnished by the instrument only those values situated in the range between $(g + a)$ and $(g - a)$, $a$ being chosen in such a manner that the normal value $g_o$ is with certainty encompassed within said range.

According to the invention, the measuring instrument includes a sensitive element having a natural resonance frequency, the value of which is characteristic of the magnitude to be measured. This sensitive element constitutes the resonant element in a feedback loop assembly comprising an amplifier of high stability. Said assembly behaves like an oscillator, the instantaneous natural oscillating frequency of which is determined by the instantaneous value of the quantity to be measured. Combined with said assembly is a local oscillator of a fixed, stable and accurately determined frequency, which injects a signal into the feedback loop of the aforesaid assembly. This local oscillator plays the part of a pulling oscillator, which compels the aforesaid assembly to oscillate, not at its natural instantaneous frequency determined by the sensitive element, but at the frequency of the signal injected into it, which originates from the local oscillator.

FIG. 1 represents schematically the circuit utilized for the realization of the device according to the invention. Reference 1 is an amplifier delivering at its output an amplified signal, the phase of which is very stable relative to the phase of the input signal, this result being obtained namely by providing the amplifier 1 with a feedback loop 2, which feeds back from the output to the input of the amplifier a fraction of the output voltage due to the presence of a subtractor 3. Reference 4 designates a resonator, which tends to impose the oscillating frequency for the assembly constituted by 1, 2, 3, 4. This resonator 4 is essentially constituted by the sensitive element of the gravimeter, for example, a vibrating wire cord or which is tensioned by the action of gravity on a mass. The voltage at the output of 4 is fed back to the input of 1 by means of a shunt 5 and a subtractor 6. The assembly 1 through 6 constitutes a feedback-loop amplifier, which oscillates at the frequency determined by the characteristics of the resonator 4, i.e. at the natural instantaneous frequency of the vibrating cord of the gravimeter, which shall be called $\omega$. In conformity with the invention, and for the purpose of performing the previously mentioned clipping operation, there is joined to the assembly of elements 1 through 6 an oscillator 7 of the frequency $\omega_o$, chosen close to $\omega$; this frequency $\omega_o$ is stable and precisely known. The output voltage of the oscillator 7 is applied to the input of the subtractor 6, which delivers at its output the difference of the voltages originating from shunt 5 and oscillator 7.

According to well known theory, for a frequency $\omega_o$ adjacent to $\omega$, the signal supplied by 7 will force the assembly 1 through 6 to oscillate at the frequency $\omega_o$ and not at the frequency $\omega$. Let $\omega_o = \omega + d\omega$, the aforesaid phenomenon satisfies the formula II below:

$$\sin \theta = x/z \sin [ \arctan (2Q \cdot d\omega/\omega) ] \quad \text{(II)},$$

where $Q$ is the overvoltage factor of the resonator 4; $x$ the amplitude of the signal fed back by the shunt 5; $z$ the amplitude of the signal delivered by the oscillator; and $\theta$ is the phase difference between the voltage at the output of 7 and the voltage at the input to subtractor 3 originating from subtractor 6.

Thus, the phase difference $\theta$ is in some way a measure of the difficulty encountered by the assembly 1 through 6 to oscillate at the frequency imposed by the signal supplied by 7. Actually, if it so happens that the instantaneous frequency of resonator 4 is equal to that supplied by oscillator 7, then $d\omega = 0$, and consequently $\theta = 0$.

The formula II shows, that under the condition of choosing the ratio $x/z$ appropriately, one can obtain a sufficient sensitivity of the variation of $\theta$ as a function of $d\omega$, to be able to deduce $d\omega$ from the measurement of $\theta$.

The clipping results from the fact that for a certain value of $d\omega$ the righthand term of formula II comes to exceed unity, whereby the formula becomes inadequate, resulting physically in the uncoupling of the assembly 1 through 6 from 7 : beginning from this value of $d\omega$, the assembly 1 through 6 oscillates at its natural frequency, since the signal injected by 7 is no longer able to influence the frequency of oscillation.

According to the invention, a phasemeter 8 is provided, which measures the phase $\theta$ between the voltage at the output of 7 and the voltage at the input to 3; this value $\theta$ is then supplied to the elements having the task of establishing the average value of $g$.

In practice, in order to avoid the influence of the interference phenomena, which occur exactly at the moment where $\theta = M/2$, it is preferable to limit the integration to those values of $\theta$, for which, for example, $\sin \theta \leq \cdot 9$.

The clipping operation thus consists in recording the values of $\sin \theta$ as long as they are in the range between $+ 0.9$ and $-0.9$, and of substituting, as applicable, $+ 0.9$, or $-0.9$, respectively, for the $\sin \theta$ values supplied by phasemeter 8, which fall outside of the aforesaid range.

In a general manner, the method according to the invention, as described above, can be utilized not only in the particular case of a gravimeter, but under any circumstance, where the signal to be measured can be converted into a frequency characteristic of the signal to be measured.

The validity of the aforesaid formula II is predicated upon the voltage at the output of the resonator 4 being maintained constant, a condition which can be met easily in a known manner by an automatic-gain-control arrangement sensitive to the output voltage of 4 and controlling the gain coefficient of 1.

Figure 2:
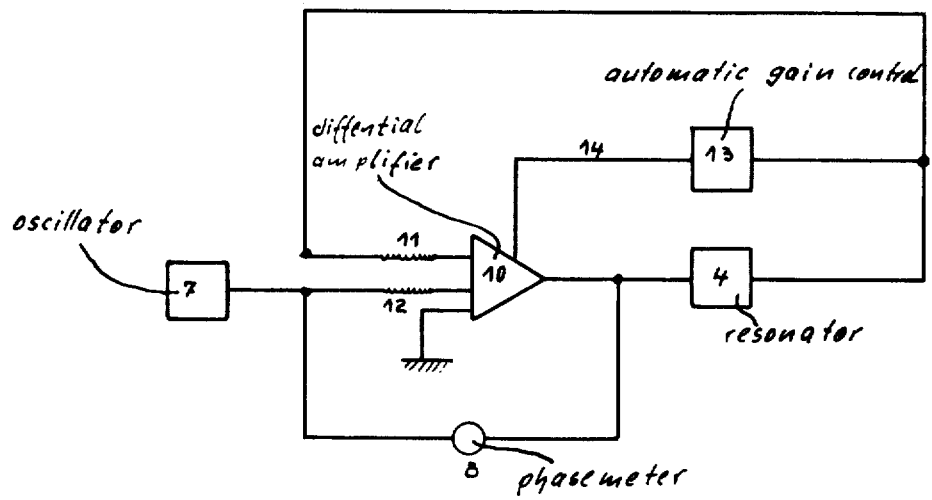
FIG. 2 schematically represents a preferred embodiment of apparatus for the application of the method of the invention in a gravimetric field.

Represented in FIG. 2 is a preferred mode of realization of the measuring instrumentation according to the invention, in which an adjustable-gain differential amplifier 10 is utilized, which plays a part of a subtractor of the two voltages applied to its inputs. One of these voltages is the output voltage from resonator 4, which is applied to one of the inputs of amplifier 10 over a resistor 11; the second voltage is that of the local oscillator 7, which is applied to a second input of amplifier 10 over a resistor 12. As usual, the body of the amplifier is connected to a common ground of the entire assembly.

There is represented at 13 the automatic-gain-control device, which maintains the output voltage from the resonator 4 constant. The input of device 13 is connected to the output of resonator 4, and the output of the device 13 is connected by the lead 14 to a special terminal of the differential amplifier 10, which permits control of the gain of that amplifier.

In this circuit, the phasemeter 8 is connected, as shown in FIG. 2, between the output of the oscillator 7 and the output of the amplifier 10, which connection is equivalent to the one indicated in FIG. 1.

The phasemeter 8 furnishes in the circuits represented in FIGS. 1 and 2, an indication of the difference $d\omega$ between the frequency $\omega_o$ of the local oscillator the the frequency $\omega$ of the resonator. Through per se known means, which are not shown, the average is drawn of these indications in such a manner that the average difference between the frequencies $\omega_o$ and $\omega$ is obtained. The characteristics of the gravimeter utilized as a sensitive element and represented in 4, will then furnish a relationship between that average difference and the fluctuation of gravity which was sought.

What is claimed is:

1. A method for use in the measurement of variations of a quantity with respect to a known reference value, in the presence of interference disturbances having greater amplitudes, and higher frequencies than those of the variations, said method comprising: supplying the output of a resonator, the natural resonant frequency of which is related to the quantity, through a feedback loop to form an oscillator assembly, subtracting the output of the oscillator assembly from a reference frequency, supplying the subtracted signal to the feedback loop of the assembly, said oscillator assembly thereby oscillating at the reference frequency only providing the difference between the said natural resonant frequency of the resonator and the reference frequency lies between prescribed limits, and measuring a phase difference between the outputs of the oscillator assembly and the reference frequency, said phase difference being representative of the difference between said natural resonant frequency and the reference frequency, and thereby of the variations of the quantity with respect to a known reference value, corresponding to the reference frequency.

2. A method as claimed in claim 1, further comprising integrating said phase difference with a predetermined time constant, to eliminate the influence of interference disturbances without altering the variations of the quantity to be measured.

3. A method as claimed in claim 1, further comprising clipping said phase difference to eliminate transient phenomena occurring when the difference between said natural resonant frequency and the reference frequency is equal to said prescribed limits, and integrating said phase difference with a predetermined time constant to eliminate the influence of interference disturbances without altering the variations of the quantity to be measured.

4. An apparatus for the measurement of variations of a quantity with respect to a known reference value, in the presence of interference disturbances of greater amplitude and higher frequency than the variations, said apparatus comprising: a sensitive element having a natural resonance frequency characteristic of the quantity to be measured; an oscillator assembly comprising amplifying and feedback means having an output connected to the input of said sensitive element such that the natural oscillating frequency of the oscillator assembly will be equal to the resonance frequency of the sensitive element, a subtracting device having an output connected to the input of said amplifying and feedback means; and a first input connected to the output of said sensitive element, a local oscillator of fixed and stable frequency having an output connected to the second input of said subtracting device; and a phasemeter connected between the outputs of to said subtracting device and of said local oscillator, the subtracting device combining the amplitudes of oscillation of the oscillator assembly and of the local oscillator such that the oscillator assembly is pulled into forced oscillation at the frequency of the local oscillator, the phasemeter furnishing indication of the phase difference between the oscillation amplitudes of the oscillator assembly and of the local oscillator, the value of said phase difference being characteristic when averaged of the variation value to be measured.

5. An apparatus as claimed in claim 4, in which said quantity is the vertical acceleration due to gravity, and said interference disturbances are spurious vertical accelerations of greater amplitude and higher frequency than the variations, the natural resonance frequency of the sensitive element corresponding to the value which is characteristic of the sum of vertical accelerations to which the sensitive element is being subjected.

6. An apparatus as claimed in claim 5, in which the sensitive element is a vibrating wire stretched taut by the action of gravity on a mass.

7. An apparatus as claimed in claim 4, in which the subtracting device is a differential amplifier.

* * * * *

UNITED STATES PATENT OFFICE
CERTIFICATE OF CORRECTION

Patent No. 3,675,485                    Dated July 11, 1972

Inventor(s) Julien M. Loeb

It is certified that error appears in the above-identified patent and that said Letters Patent are hereby corrected as shown below:

On the cover sheet [73] "Compagnie Generale De Ceophysique" should read -- Compagnie Generale de Geophysique -- .

Signed and sealed this 12th day of December 1972.

(SEAL)
Attest:

EDWARD M. FLETCHER, JR.                 ROBERT GOTTSCHALK
Attesting Officer                       Commissioner of Patents